United States Patent

Yokota et al.

[11] Patent Number: 5,572,368
[45] Date of Patent: Nov. 5, 1996

[54] LIGHT PROJECTING DEVICE WITH CYLINDRICAL LENS

[75] Inventors: Hidetaka Yokota; Tsuyoshi Ishikawa, both of Tokyo, Japan

[73] Assignee: Asahi Kogaku Kogyo Kabushiki Kaisha, Tokyo, Japan

[21] Appl. No.: 219,452

[22] Filed: Mar. 29, 1994

[30] Foreign Application Priority Data

Mar. 29, 1993 [JP] Japan ................................ 5-093680

[51] Int. Cl.⁶ .......................................... G03B 3/00
[52] U.S. Cl. ........................ 359/710; 396/89; 396/106
[58] Field of Search ................................ 354/403, 406, 354/145.1, 149.1, 149.11, 165; 359/710

[56] References Cited

U.S. PATENT DOCUMENTS

| | | | |
|---|---|---|---|
| 4,771,308 | 9/1988 | Tejima et al. | 354/403 |
| 4,804,991 | 2/1989 | Ishizuki | 354/403 |
| 4,870,442 | 9/1989 | Tejima et al. | 354/403 |
| 4,905,034 | 2/1990 | Tejima et al. | 354/403 |
| 4,907,026 | 3/1990 | Koyama | 354/403 |
| 5,051,767 | 9/1991 | Honma et al. | 354/406 |
| 5,137,350 | 8/1992 | Misawa et al. | 356/1 |
| 5,305,047 | 4/1994 | Hayakawa | 354/403 |

FOREIGN PATENT DOCUMENTS 1-75209  5/1989  Japan ................. G02B 7/11

*Primary Examiner*—David C. Nelms
*Assistant Examiner*—Son Mai
*Attorney, Agent, or Firm*—Greenblum & Bernstein, P.L.C.

[57] ABSTRACT

A light projecting device used to project light onto an object has a light source and a projection lens system. The light emitted by the light source is refracted by the projection lens system to form an image pattern consisting of alternate bright and dark areas. The image pattern is used to illuminate an object whose distance is to be measured using a passive distance measuring system. The projection system consists of only converging lenses.

37 Claims, 16 Drawing Sheets

FIG. 4
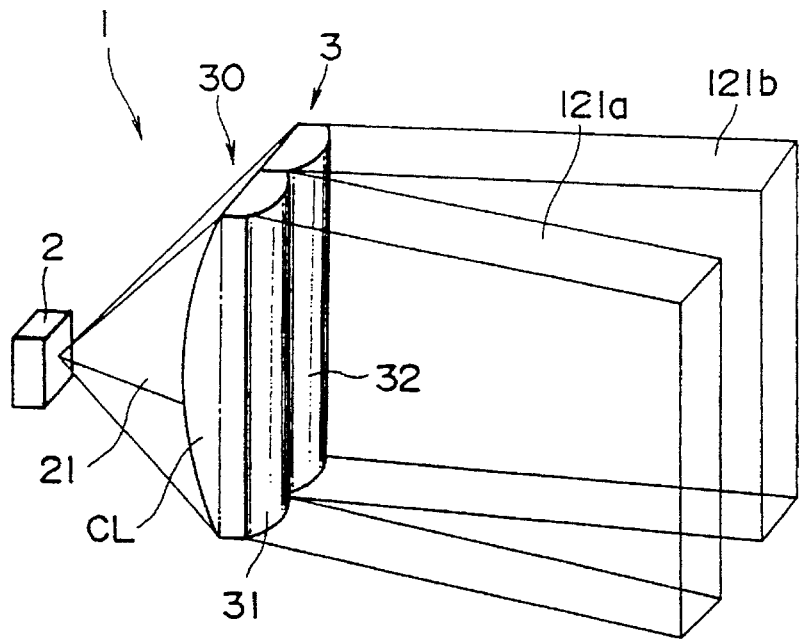
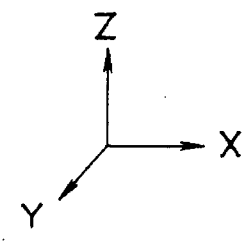
FIG. 5
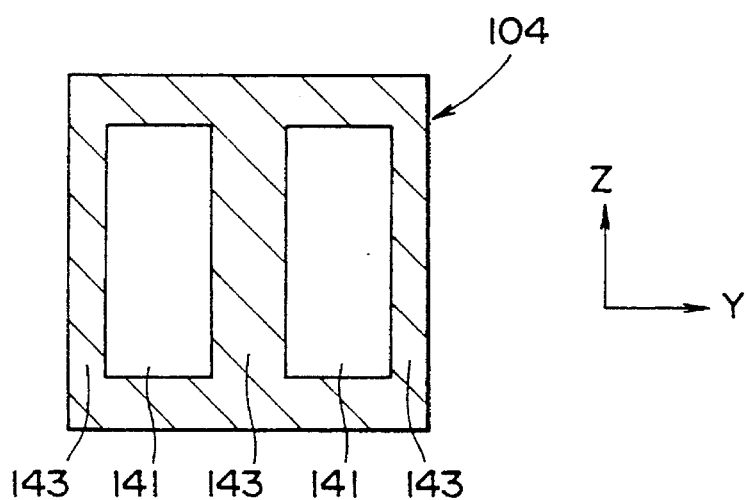

F I G. 20
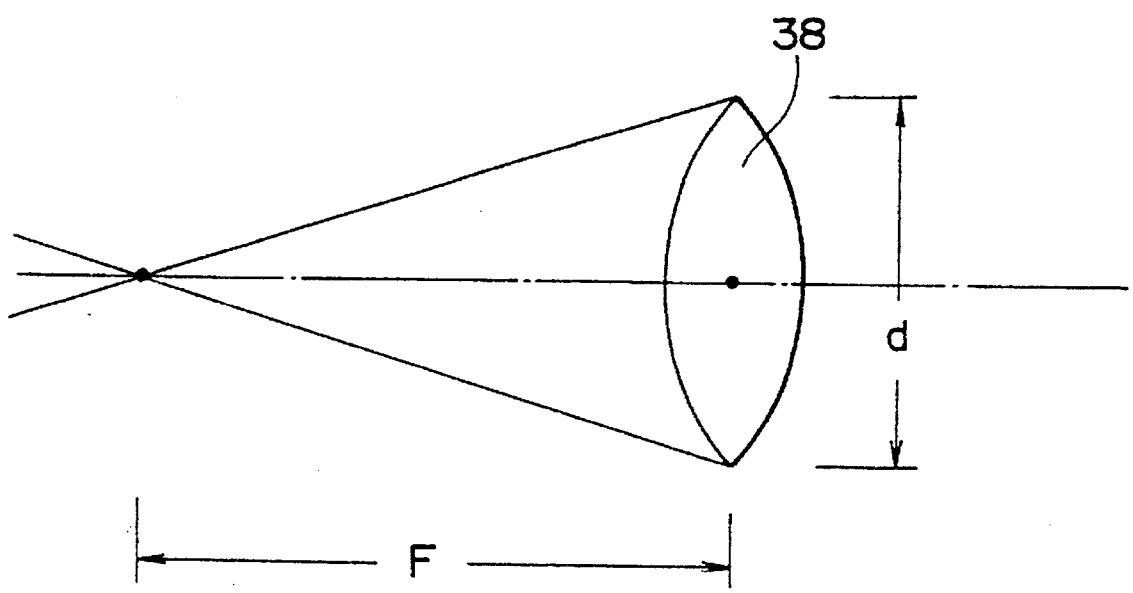

LIGHT PROJECTING DEVICE WITH CYLINDRICAL LENS

BACKGROUND OF THE INVENTION

The present invention relates to a light projecting device used by a distance measuring apparatus to measure the distance of an object from the apparatus.

Conventionally, various types of distance measuring apparatus have been proposed for cameras, video cameras and other optical equipment. One common distance measuring apparatus employs a passive distance measuring method (Phase Matching method).

A passive distance measuring method uses two sensors located on a plane and separated by a certain distance, to measure light reflected by an object. This system utilizes the ambient light to illuminate the object, and thus has low power consumption. Further, a passive system can be used to measure a distance of an object that is far away. An active system which employs a pulsed light source to illuminate an object, can only measure the distance of objects close to a light source. Thus a passive system can accurately drive the lens to focus on distant objects.

These features have made the passive distance measuring method very popular in autofocus single lens reflex cameras and zoom compact cameras.

However, the passive distance measuring method relies on a high contrast ratio between the object and background since there must be enough light reflected by the object In order to properly measure the object distance. Further, the distance of a uniformly lit object such as a wall, which has a similar brightness level across its surface, cannot be accurately determined, using a passive distance measuring method.

SUMMARY OF THE INVENTION

It is therefore an object of the present invention to provide a light projecting device which can project a sharp image over a long distance, and which has a low power consumption and low cost.

According to an aspect of the present invention there is provided a light projecting device used to project light onto an object. The light projecting device includes:

a device for emitting light; and a device for projecting the emitted light, with the projecting device refracting the emitted light such that an image pattern having alternate bright and dark areas is projected. The projecting device includes only a plurality of converging lenses.

According to another aspect of the Invention, there is provided a light projecting device employed in a passive distance measuring system. The light projecting device projects a predetermined image pattern towards an object. The light projecting device includes:

a light source for emitting diverging light; and a plurality of converging lenses arranged side by side, along a predetermined direction, with each of the converging lenses refracting the emitted light such that the emitted light, that is refracted, is converged in at least a predetermined Direction. Whereby the emitted light, that is refracted forms a predetermined image pattern, with the predetermined image pattern having alternate bright and dark areas.

DESCRIPTION OF THE ACCOMPANYING DRAWINGS

FIG. 4 shows a configuration of the light projecting device as a second embodiment of the invention;

FIG. 5 shows an example of a light pattern projected by the second embodiment of the light projecting device;

FIG. 20 illustrates an f-number of a lens.

DESCRIPTION OF THE EMBODIMENTS

Figure 1:
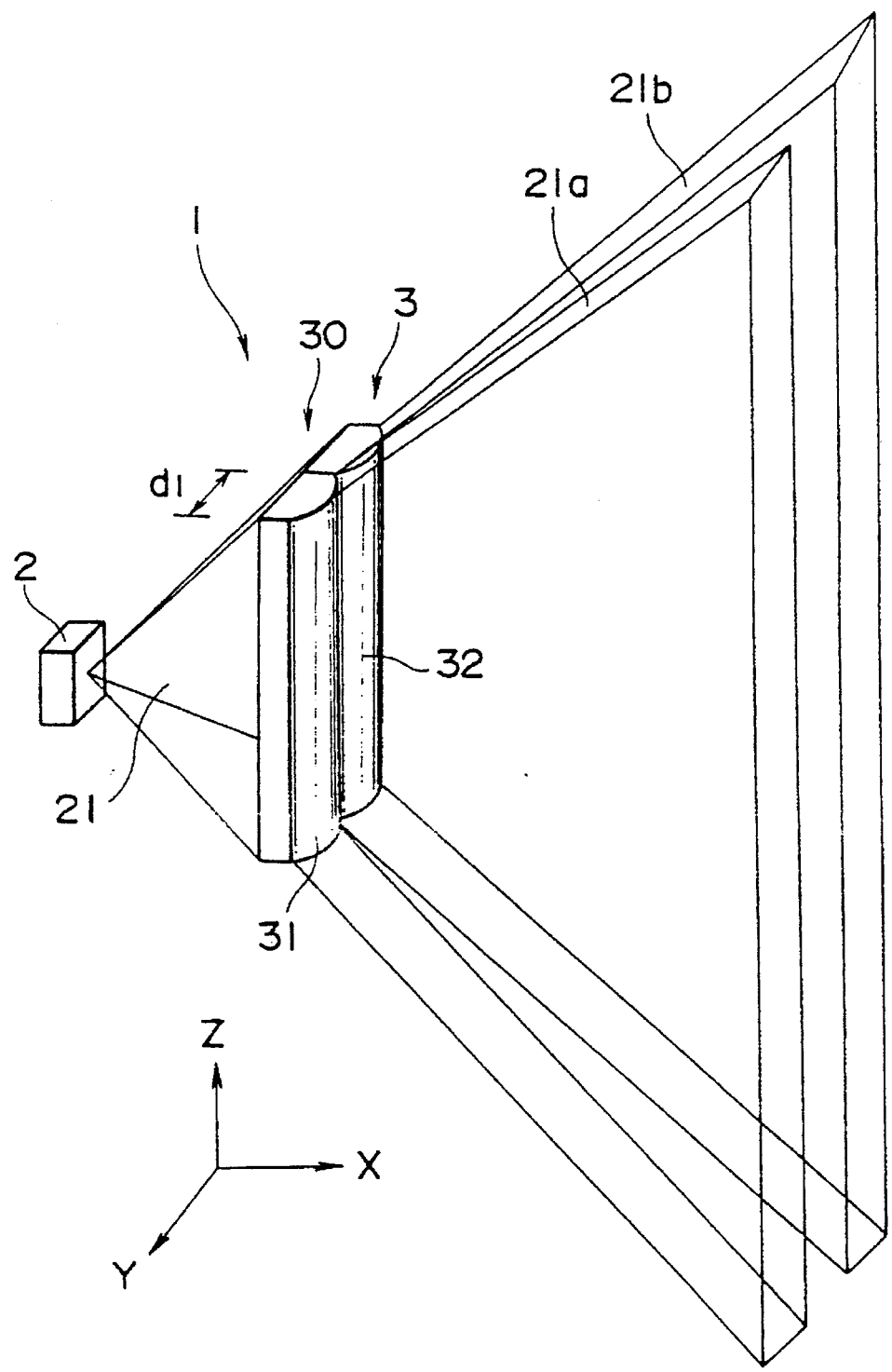
FIG. 1 shows a configuration of the light projecting device as a first embodiment of the invention.

FIG. 1 shows a configuration of a light projecting device 1 as a first embodiment of the present invention. The light projecting device 1 includes a light source 2 and an optical projecting system 3. The light source 2 can be any light source, but best results are obtained using a point source such as an LED.

The optical projecting system includes a lens 30 which consists of two cylindrical lenses 31 and 32, positioned in front of the light source 2 (ie., between the object and the light source). Lenses 31 and 32 are arranged next to each other, as shown in FIG. 1.

An X,Y,Z coordinate system, as shown in FIG. 1, will be used to explain the orientation of the lenses and light path.

The X-axis represents the optical axis of the light source 2 and the lens 30. The Y-axis represents the direction in which the two lenses 31 and 32 are positioned relative to each other (as well as the positional displacement of the two Images detected by the passive measuring apparatus). The Z-axis represents the direction in which the cylindrical lenses 31 and 32 extend.

The surface of the cylindrical lenses 31 and 32 which is facing the object, is convex, as shown in FIG. 1. This results in the convergence of the light rays, in the Y-axis direction. This Y-axis convergence remains constant in the Z-axis direction. Further, the optical and physical characteristics of the two cylindrical lenses 31 and 32 are the same. Thus, the manufacturing costs can be lowered. Further the two lenses 31 and 32 may be manufactured as one integrally formed lens, such as a lenticular lens.

Figure 2:
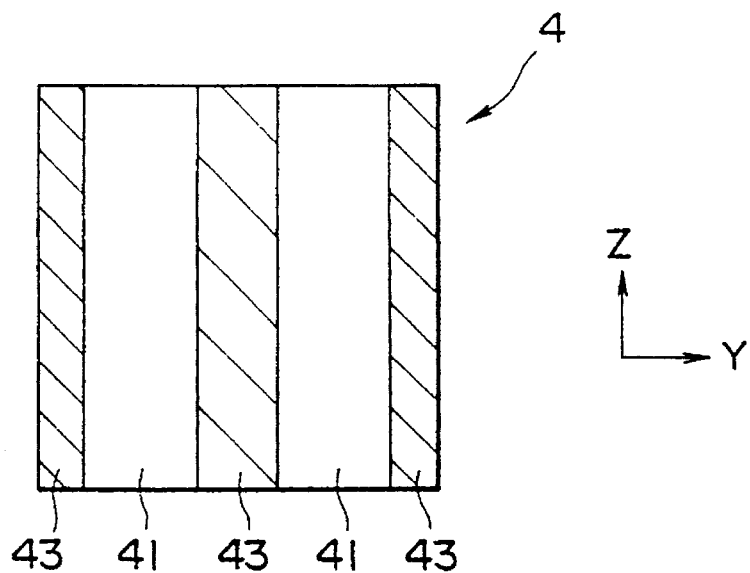
FIG. 2 shows an example of a light pattern projected by the first embodiment of the light projecting device.

The light source 2 is preferably located near to or at the focal point of the lens 30. The light emitted by light source 2 diverges from light source 2 and is refracted by lens 30 or by the pair of lenses 31 and 32 such that two refracted beams 21a and 21b are produced, as shown in FIG. 1. The resultant light pattern 4, as shown in FIG. 2, has bright areas 41 and dark areas 43. Thus when the light projecting device 1 is used to project light onto an object, the surface of the object will be illuminated with light pattern 4. The object will then be nonuniformly illuminated, allowing the conventional passive distance measuring apparatus to measure the distance of the object from the camera.

Figure 3:
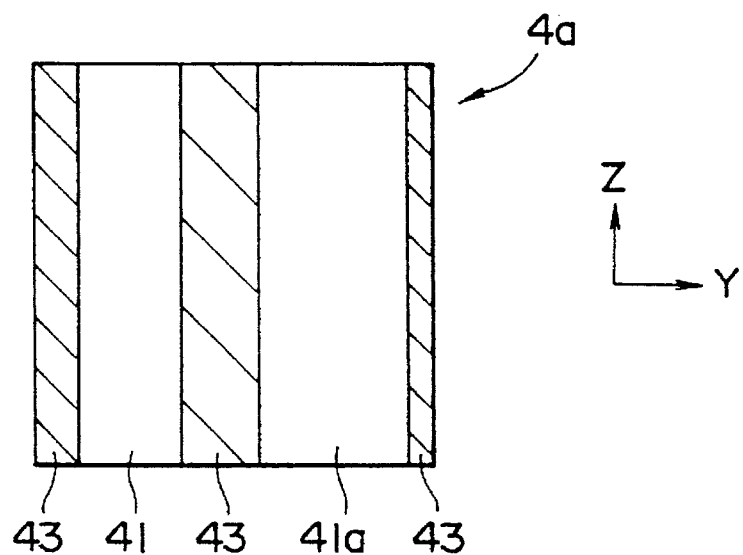
FIG. 3 shows an example of a light pattern projected by a modification of the first embodiment.

A modification to the first embodiment produces the light pattern 4a shown in FIG. 3. In this modified embodiment the f-number of the cylindrical lenses 31 and 32 are different from each other. The f-number will be explained with reference to FIG. 20. The f-number of a lens 38 is defined as:

$$f=F/d$$

where F is a focal length of the lens 38, d is a effective diameter of the lens 38. In FIG. 1, the width d1 of the cylindrical lens 31, along the direction Y, is defined as the effective diameter.

In the modified first embodiment, the focal length F of the lenses 31 and 32 is the same, but the effective diameter d is different. Thus, the width of the bright areas 41, 41a is different for each lens. The resulting non-repetitive light pattern 4 improves accuracy in determining the distance of the object since a different image is produced for each of the bright areas 41. A similar result could have been achieved by changing the focal length of the lens.

If the lens 30 has more than two cylindrical lenses, the lenses may each have a different f-number, or some lenses may have the same f-numbers.

FIG. 4 shows a second embodiment of a light projecting device 1.

The second embodiment is similar to the first embodiment. The common elements have the same reference numbers and will not be described. The optical projecting system 3 includes a lens 3 which includes a cylindrical lens CL in addition to the lenses 31 and 32. The lens CL collimates the light rays (in the Z-axis direction) emitted from the light source 2 before the light is incident on the lenses 31 and 32. The refracted beams 121a and 121b are produced as shown in FIG. 4. The resulting light pattern 104, as shown in FIG. 5, is thus restricted from diverging In the Z-axis direction.

Since the pattern is limited in the Z and Y directions, the light intensity of the bright areas 141 will be greater than that of bright areas 41 produced in the first embodiment. Thus, the light projecting device 1 of the second embodiment can project light further than that of the first embodiment.

Instead of a separate lens CL, the curvature of the lens CL can be incorporated into the converging lenses 31 and 32. Thus, one integrally formed lens can be used instead of three lenses.

Figure 6:
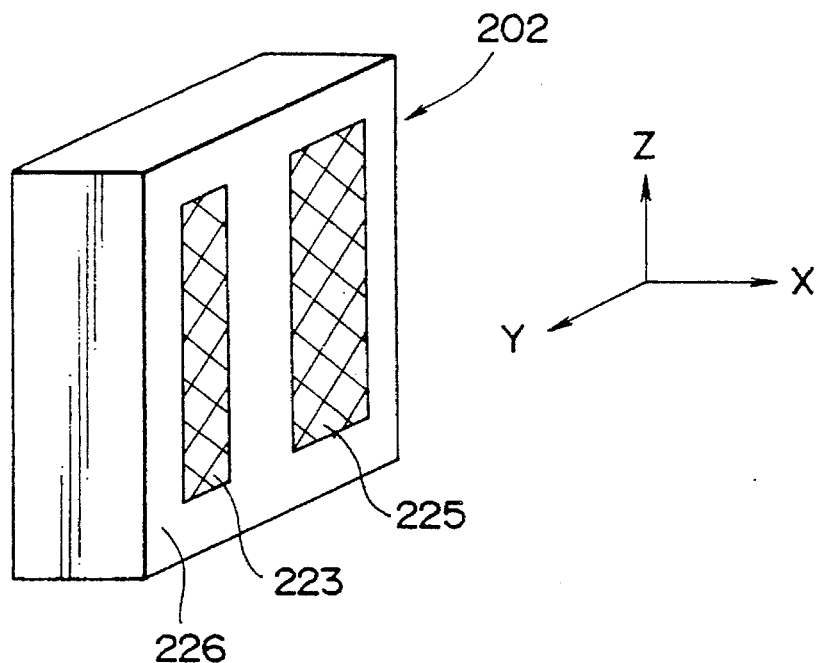
FIG. 6 shows a structure of the light source according to a third embodiment of the invention.

FIG. 6 shows a light source 202 used in a third embodiment of the present invention. The light source 202 has light shield masks 223 and 225 which are formed on the front light emitting surface 226 in the YZ plane. The light shield masks 223 and 225 are rectangular, but may be other shapes. The masks 223 and 225 are formed by coating the light emitting surface 226 with aluminum and then etching the mask pattern. Other mask forming methods may also be used.

In this embodiment the Image of the light shield masks 223 and 225 should be focused on the object. Therefore the light source 202 should be located behind the focal point of the lens 30, so that the pattern will be focused on the object. Thus, the pattern will be projected 1 to 3 meters in front of the light projecting device 1.

Figure 7:
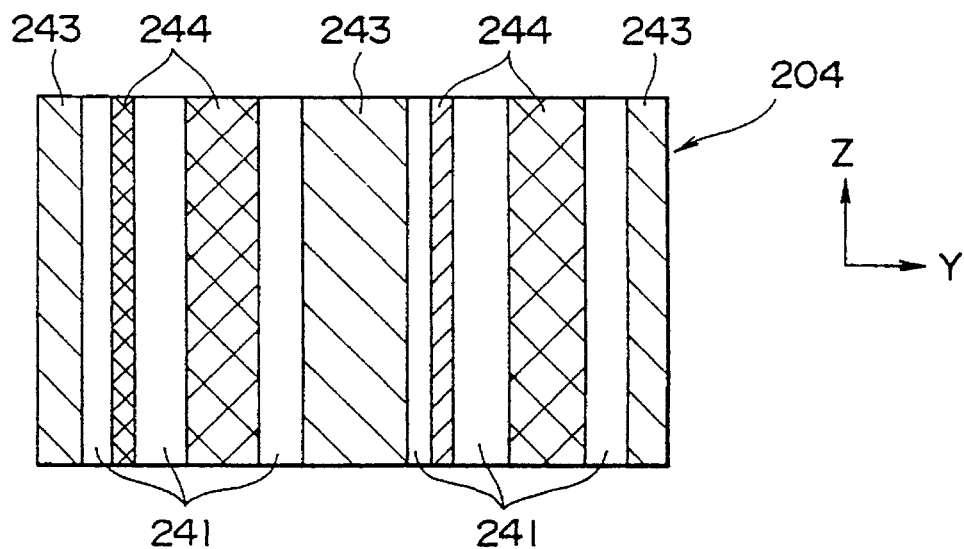
FIG. 7 shows an example of a light pattern projected by the third embodiment of the light projecting device.

The configuration of the third embodiment is similar to the first embodiment, as shown in FIG. 1, except that the light source 202 is used instead of light source 2. The resulting light pattern 204 is shown in FIG. 7. Dark stripes 244 correspond to the light shield masks 223 and 225, while dark areas 243 are similar to dark areas 43 of the first embodiment. Bright stripes 241 are similar to bright areas 41 of the first embodiment.

According to the third embodiment, a complex light strip pattern can be generated by using a simple mask pattern on the light emitting surface of the light source. The complex light pattern improves accuracy in the distance measuring, since each bright area can have a different size and shape depending on the size and shape of the adjacent dark areas. The size and shape of the dark areas is determined by the size and shape of tile light shield mask pattern. Further, the number and shapes of the masks are not limited to those described above.

Figure 8:
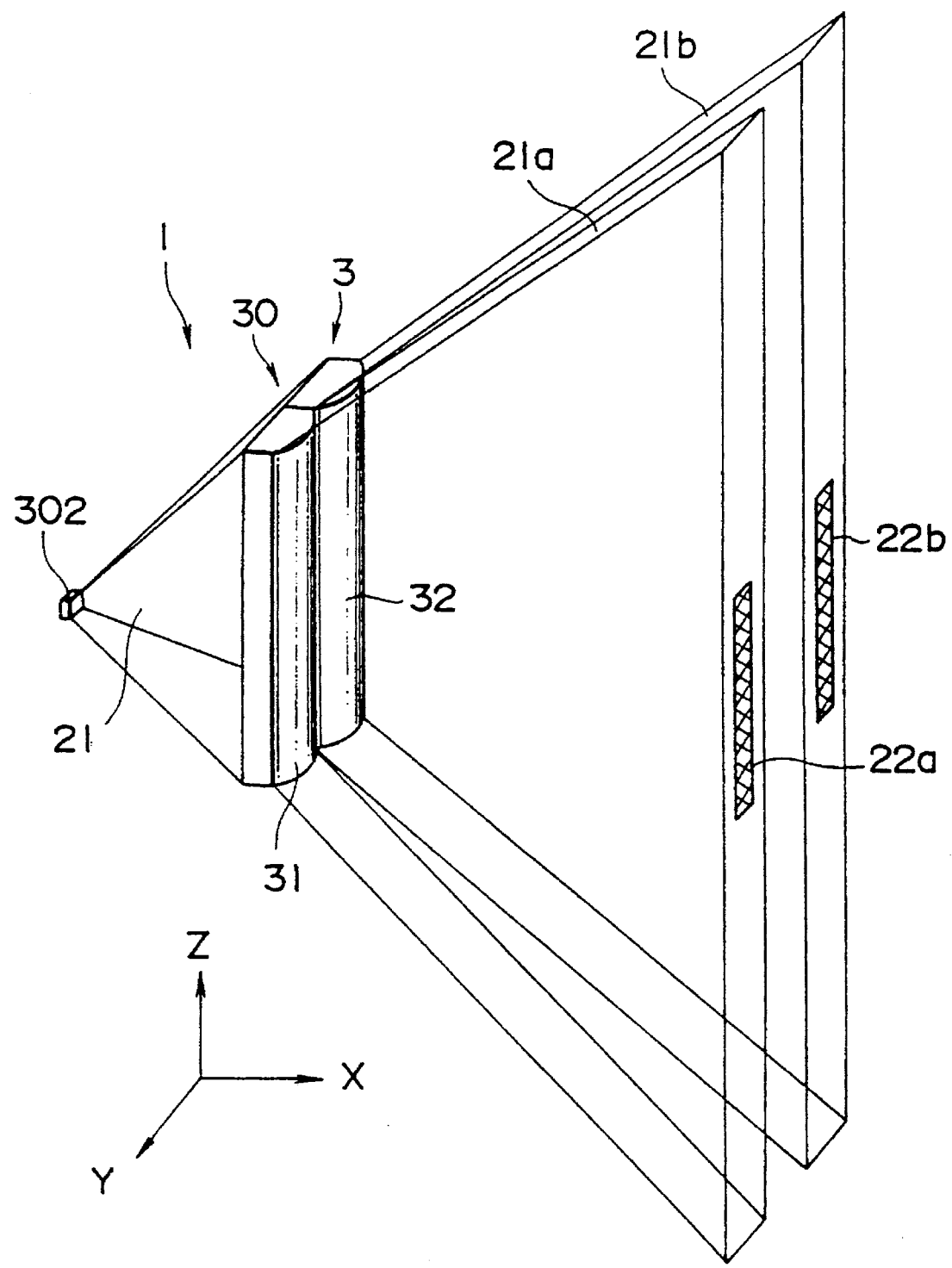
FIG. 8 shows a configuration according to a fourth embodiment of the invention.

FIG. 8 illustrates a fourth embodiment according to the present invention. This embodiment is similar to the first embodiment except that light source 302 is used instead of light source 2. The elements common to both the fourth and first embodiments have the same reference numbers, and will not be described.

Figure 9:
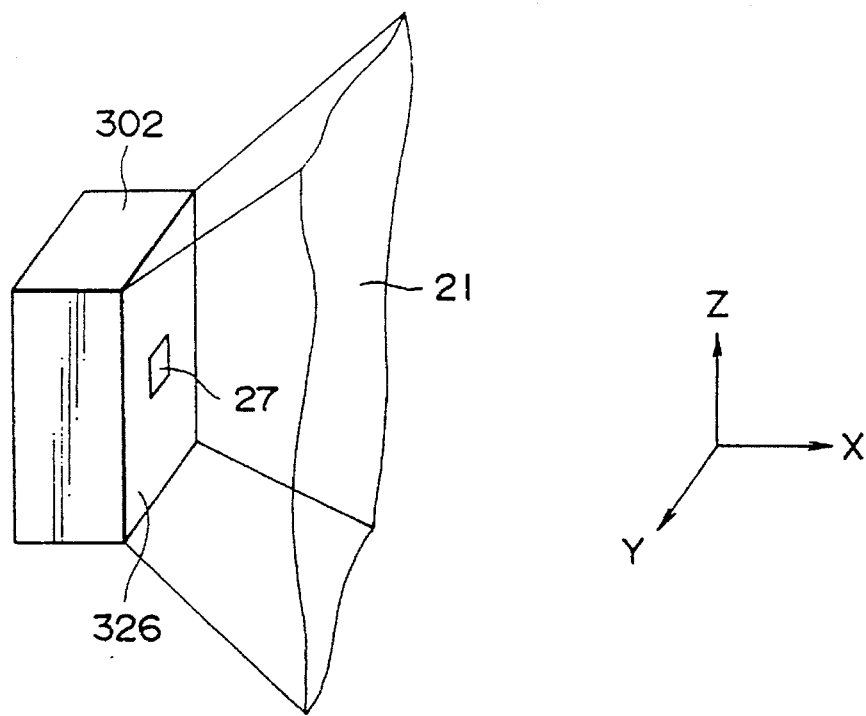
FIG. 9 shows a structure of the light source used in the fourth embodiment of the Invention.
Figure 10:
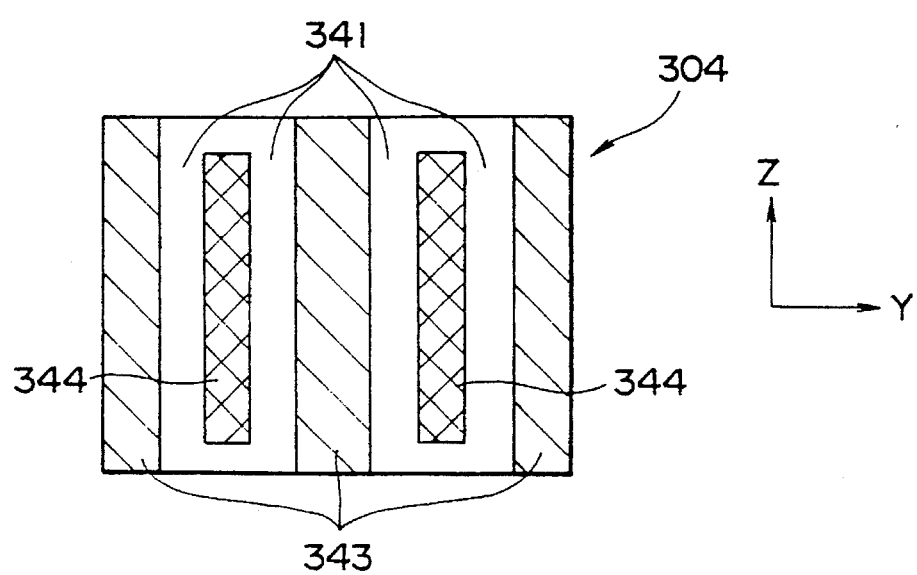
FIG. 10 shows an example of a light pattern projected by the fourth embodiment of the invention.

The light source 302 is shown in FIG. 9. The light source 302 includes a light emitting diode (LED) having a terminal 27 on its light emitting surface 326. The terminal 27 functions as an electrical terminal as well as a light shielding mask. The terminal 27 shields a portion of the ray 21, such that the refracted ray has dark portions 22a and 22b. The resulting light pattern 304 is shown in FIG. 10. Dark portions 22a and 22b correspond to dark areas 344. The portion of the light emitting surface 326, that is not shielded, forms bright area 341, similar to bright area 41 of the first embodiment. The dark areas 343 are formed in a similar manner to dark areas 43 of the first embodiment.

Thus, as a result of having the terminal located on its light emitting surface, the light projecting device can generate a more complex light pattern. Thus, no additional mask is necessary, and the cost of manufacture can be reduced.

Figure 11:
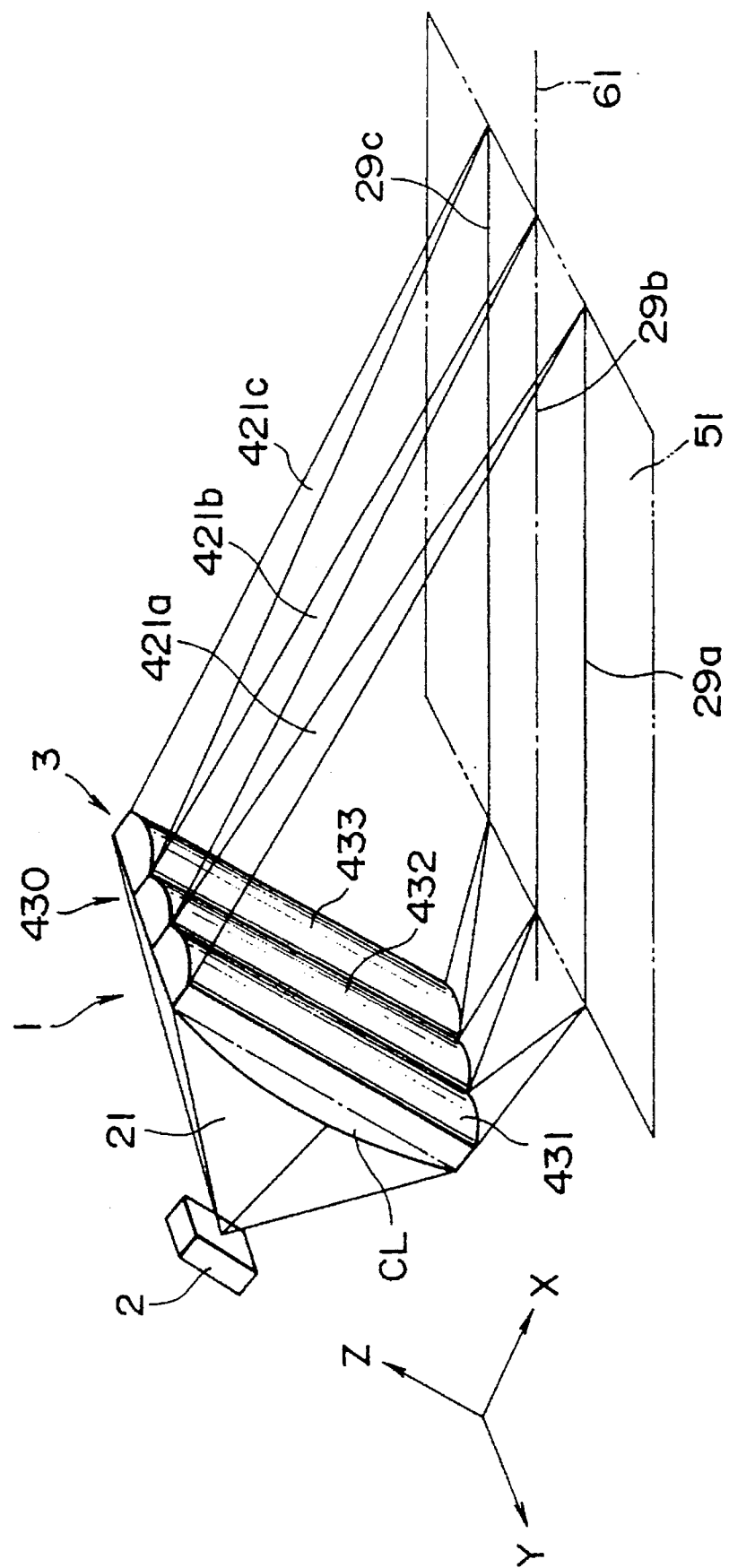
FIG. 11 shows a configuration of the light projection device as a fifth embodiment.

FIG. 11 shows a perspective view of a fifth embodiment. In this embodiment, the light projecting device 1 is arranged such that it is inclined relative to an optical axis 61 of the distance measuring apparatus. The elements common to this embodiment and previous embodiments have the same reference numbers and will not be described. The lens 430 includes cylindrical lenses 431, 432, 433 and CL. The lenses 431, 432 and 433 have a curved portion, on the side facing the object. The curvature at the top of the lenses 431, 432 and 433 is smaller than the curvature at the bottom of the lenses, with the curvature increasing uniformly from the top to bottom of the respective lens.

The curvature of the lenses 431, 432 and 433 is such that the image of the light source is focused along line 29*b* which coincides with the optical axis 61. However, it is possible that the light projecting device 1 is arranged such that one of the focus lines 29*a* or 29*c*, located on the same plane 51 as focus line 29*b*, coincides with the optical axis 61.

Figure 12:
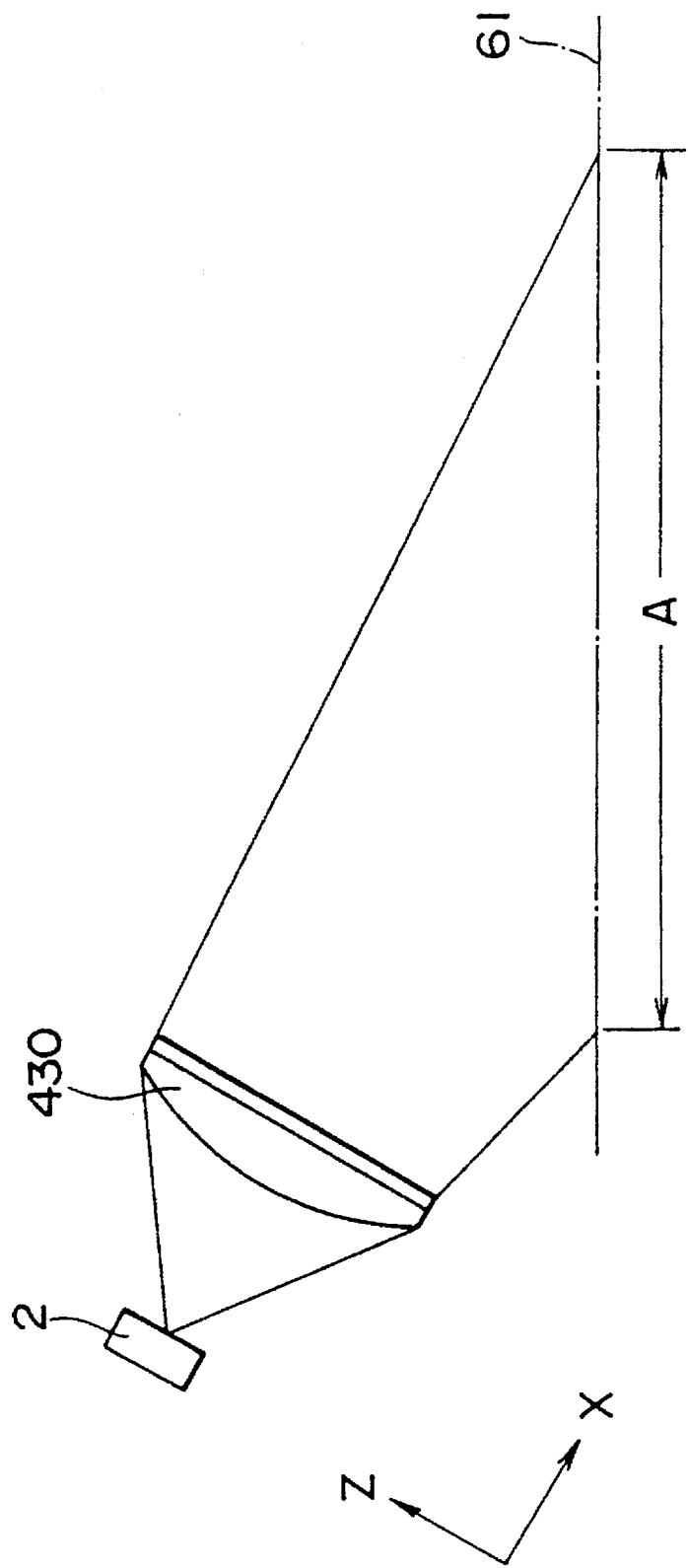
FIG. 12 is a side view of the light projection device shown in FIG. 11.

With the light projecting device 1 as constructed above, a strip pattern image is projected on an object. The rays 421*a*, 421*b* and 421*c* are coincident or close to the optical axis 61. Further the projected image is in focus at any point along the image-projected range A, as shown in FIG. 12. Therefore a focused, high contrast image can be projected on the object regardless of the distance of the object from the lens projecting device 1.

Figure 18:
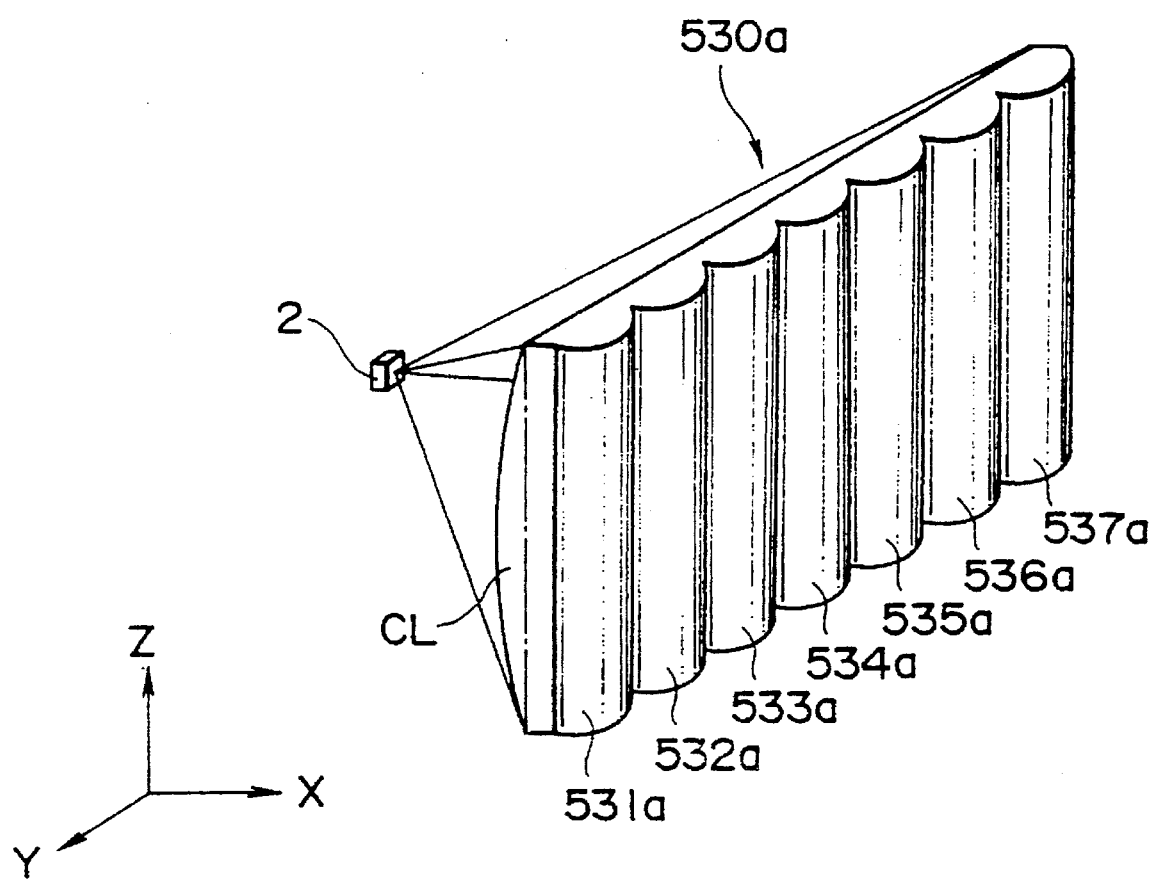
FIG. 18 shows a structure of a lens used in the light projection device shown in FIG. 16.

FIG. 18 shows a sixth embodiment of the light projecting device 1. Elements common to previous embodiments have the same reference numbers and will not be described.

Figure 13:
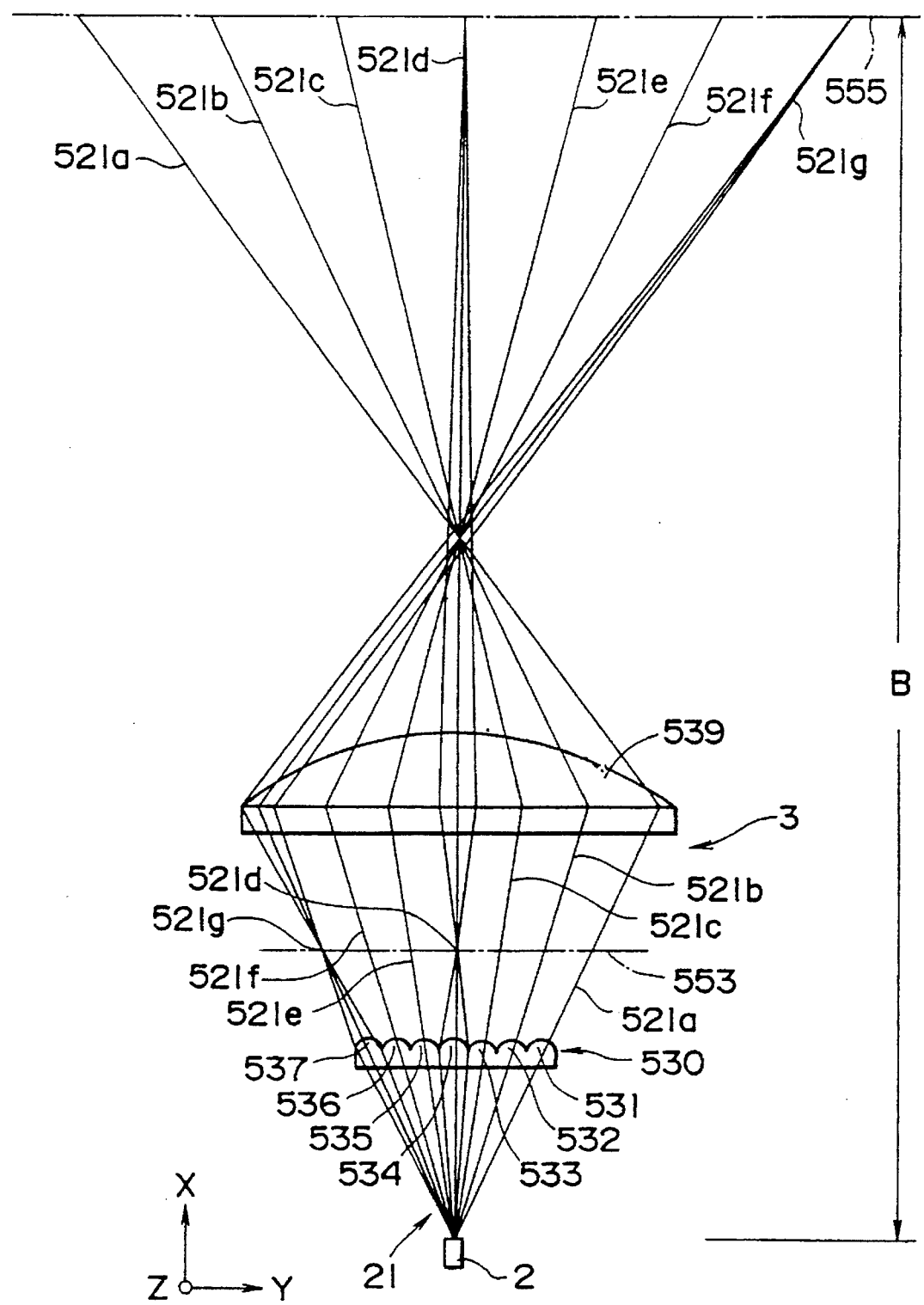
FIG. 13 shows a configuration of the light projecting device according to a sixth embodiment of the invention.

Lens 530 (a lenticular lens) includes seven cylindrical lenses 531, 532, 533, 534, 535, 536 and 537. Each of these lenses has the same focal length and have a curvature along the Y-axis. A projection lens 539 is additionally provided in the light projecting device 1. The lens 539 has a curvature such that light is refracted primarily in the Y and Z directions, as shown in FIG. 13. The rays 521*a* through 521*g* are refracted by the lenses 531 through 537 respectively, then refracted by the projecting lens 539 towards the object. The curved surface of the lens 539 is defined as a portion of a spherical surface.

As shown in FIG. 13, the focal point of the projection lens 539, is in front of a focal plane 553 of lens 530 (ie., between the focal plane 553 and the projection lens 539). The lens 530 and light source 2 are located behind the focal plane 553.

In this embodiment, the light 21 emitted by the light source 2 is divided into separate rays 521*a* through 521*g* by lens 530. The rays are then focused on focal plane 553. This becomes the position of the light source for the projection lens 539. Therefore the rays 521*a* through 521*g* are refracted by the projection lens 539 and focused on the focal plane 555.

As further shown in FIG. 13, the optical path lengths of the individual rays are different, therefore the widths of the strips of the projected image will also be different. Thus an accurate determination of the distance to the object can be made.

When the light projection device 1 of this embodiment is employed in a compact camera, a position of the projection lens 539 is determined so that the distance B, between the light source 2 and the object, is 1 to 3 meters.

Figure 14:
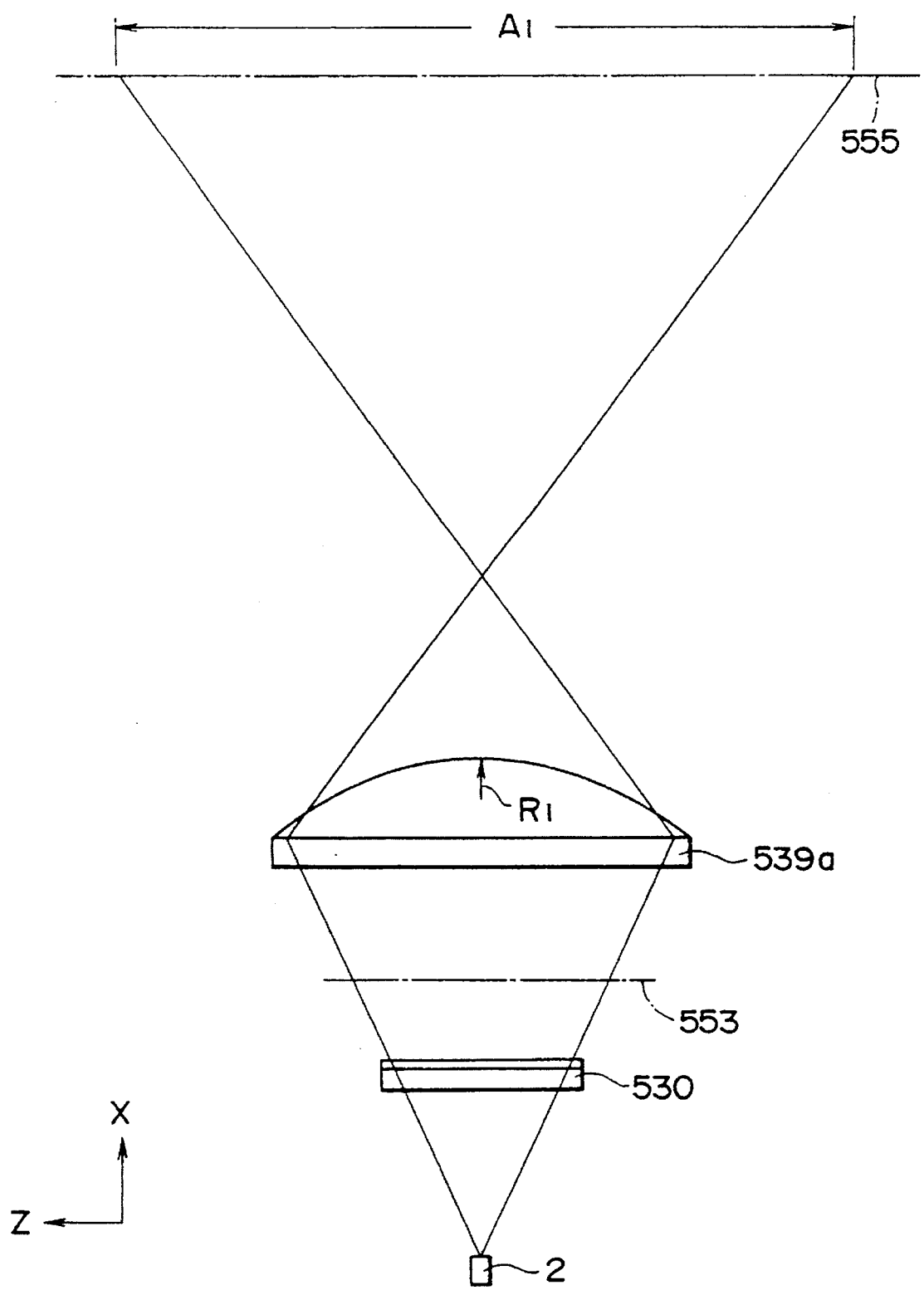
FIG. 14 shows a configuration of the light projecting device according to a seventh embodiment of the invention.

A seventh embodiment of the light projection device 1 is shown in FIG. 14. This device is similar to the sixth embodiment described previously, except that the projection lens 539*a* has a curved surface that is defined as a portion of a toric surface. The curvature of the lens 539*a* in the XY plane is the same as that for lens 539, as shown in FIG. 13, while the radius of curvature of the projection lens 539*a* in the XZ plane is smaller. As a result, the focal point of the projection lens 539*a* in the XZ plane is closer to the projection lens, than the focal point in the XY plane. The area of the projected image in the XZ plane 555, is A1.

Figure 15:
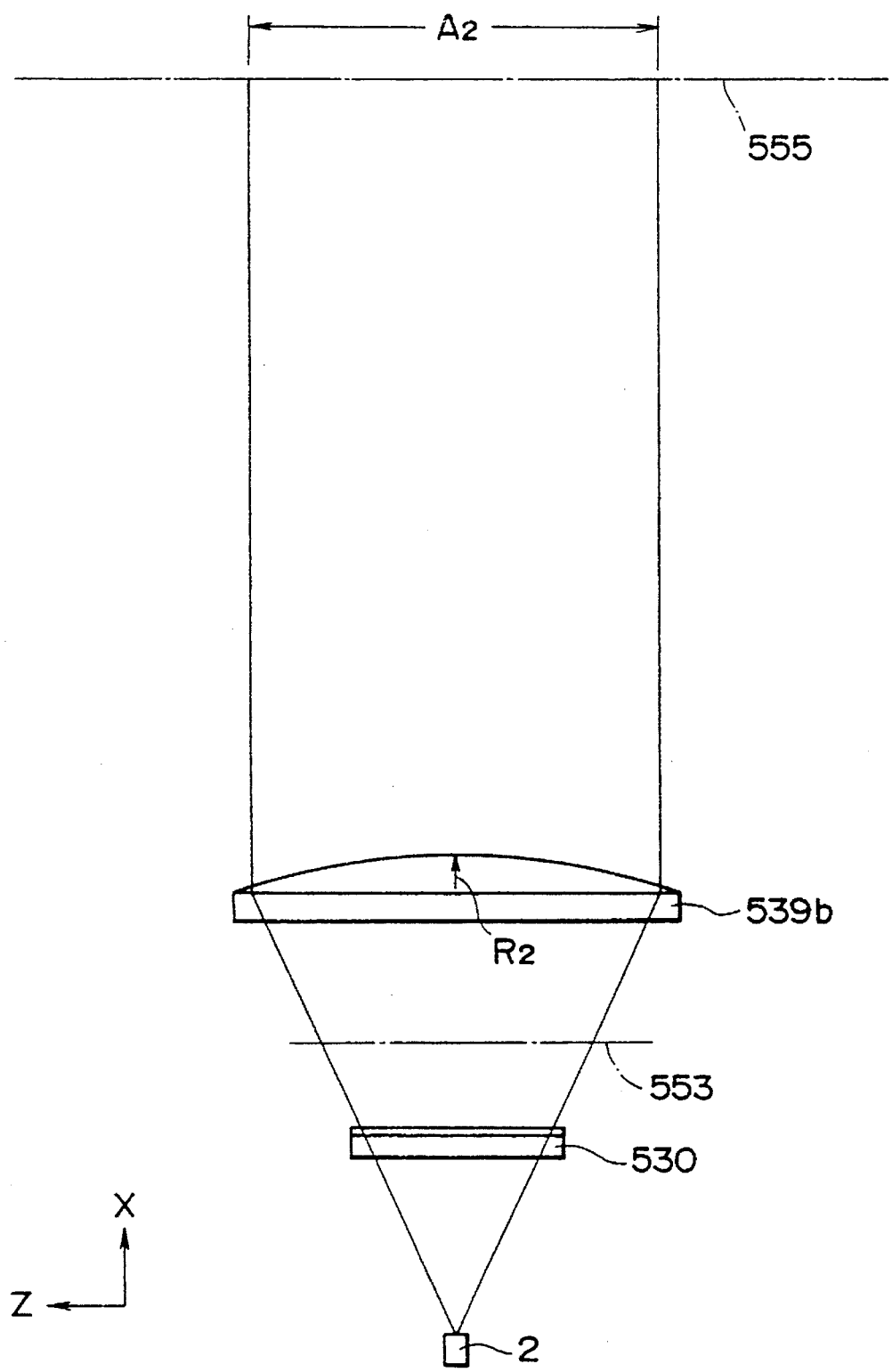
FIG. 15 shows a configuration of the light projecting device according to an eighth embodiment of the invention.

An eighth embodiment of the light projection device 1 is shown in FIG. 15. This is similar to the seventh embodiment shown in FIG. 14 except that the radius of curvature is larger for the eighth embodiment. The light projecting device 1 is constructed such that the rear focal point of the projection lens 539*b* is on the focal plane 553 or between the focal plane 539 and the lens 530. Therefore, the light does not converge on the XZ plane, but is focused at infinity. The area of the projected image in the XZ plane 555, is A2.

A ninth embodiment of the light projecting device 1 is similar to the sixth embodiment shown In FIG. 13, except the projection lens 539 can move in the X direction. The position of the projection lens 539 varies either continuously or stepwisely, according to the focal length of the photographing lens. This results in the focal plane 555 being adjacent to or coincident with, the surface of the object. Since the image plane 555 is adjacent to or coincident with the object surface, a high contrast stripe image pattern can be projected on the object.

Figure 16:
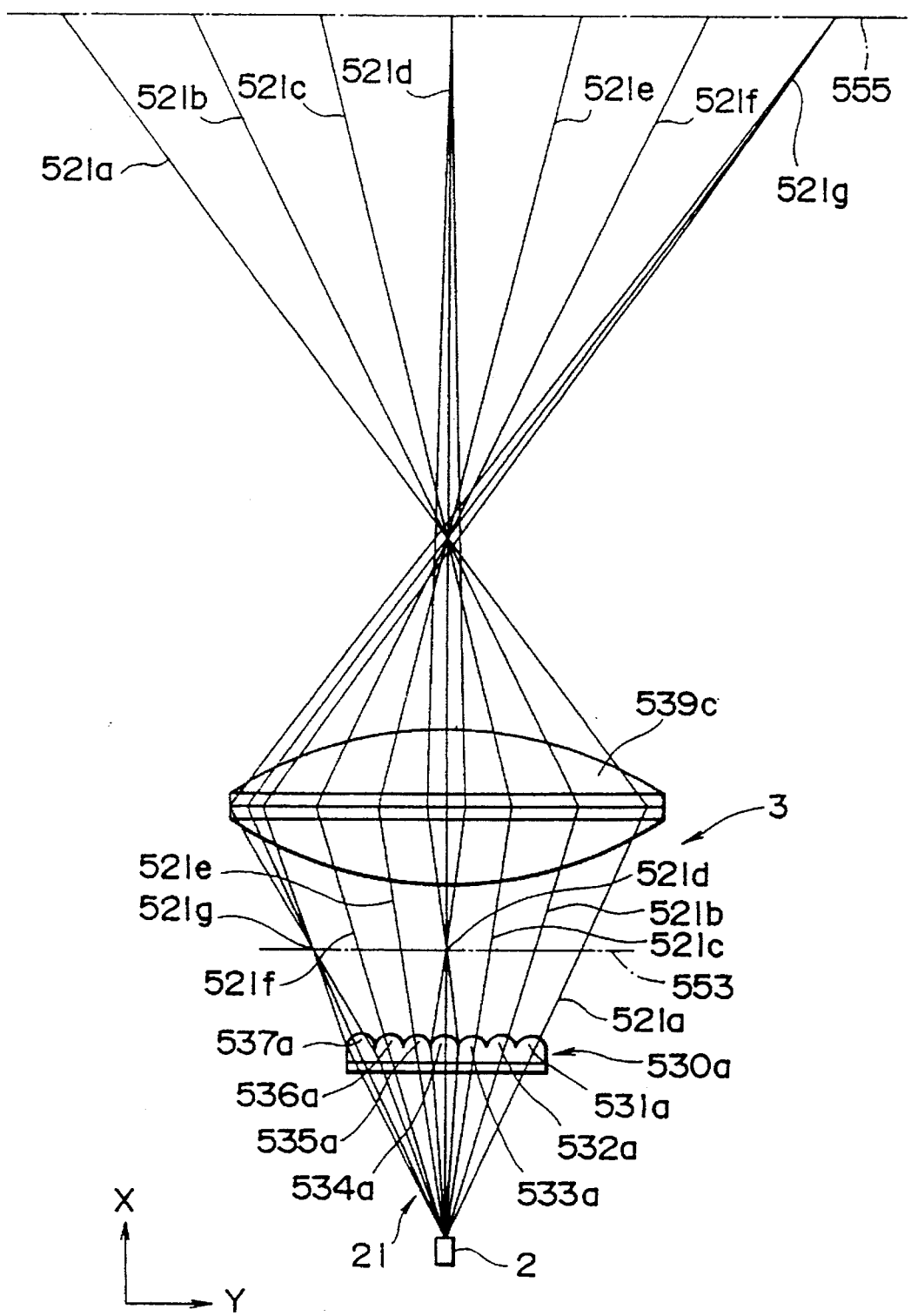
FIG. 16 shows a configuration of the light projecting device according to a tenth embodiment of the invention.

A tenth embodiment of the light projecting device 1 is shown in FIG. 16. This Is similar to the sixth embodiment shown in FIG. 13 except that the projection lens 539*c* and cylindrical lens 530*a* are employed.

The light projection lens 539*c* has convex surfaces on its front and rear surfaces, and is curved in both the Y and Z directions. The cylindrical lens 530*a* is similar to the cylindrical lens 530, but also includes the cylindrical lens CL which is curved in the Z direction, as shown In FIG. 18. Further the curvature at the top of the lenses 531*a* through 537*a* is larger than the curvature at the bottom of the lenses, with the curvature decreasing uniformly from the top to bottom of the respective lens.

Figure 17:
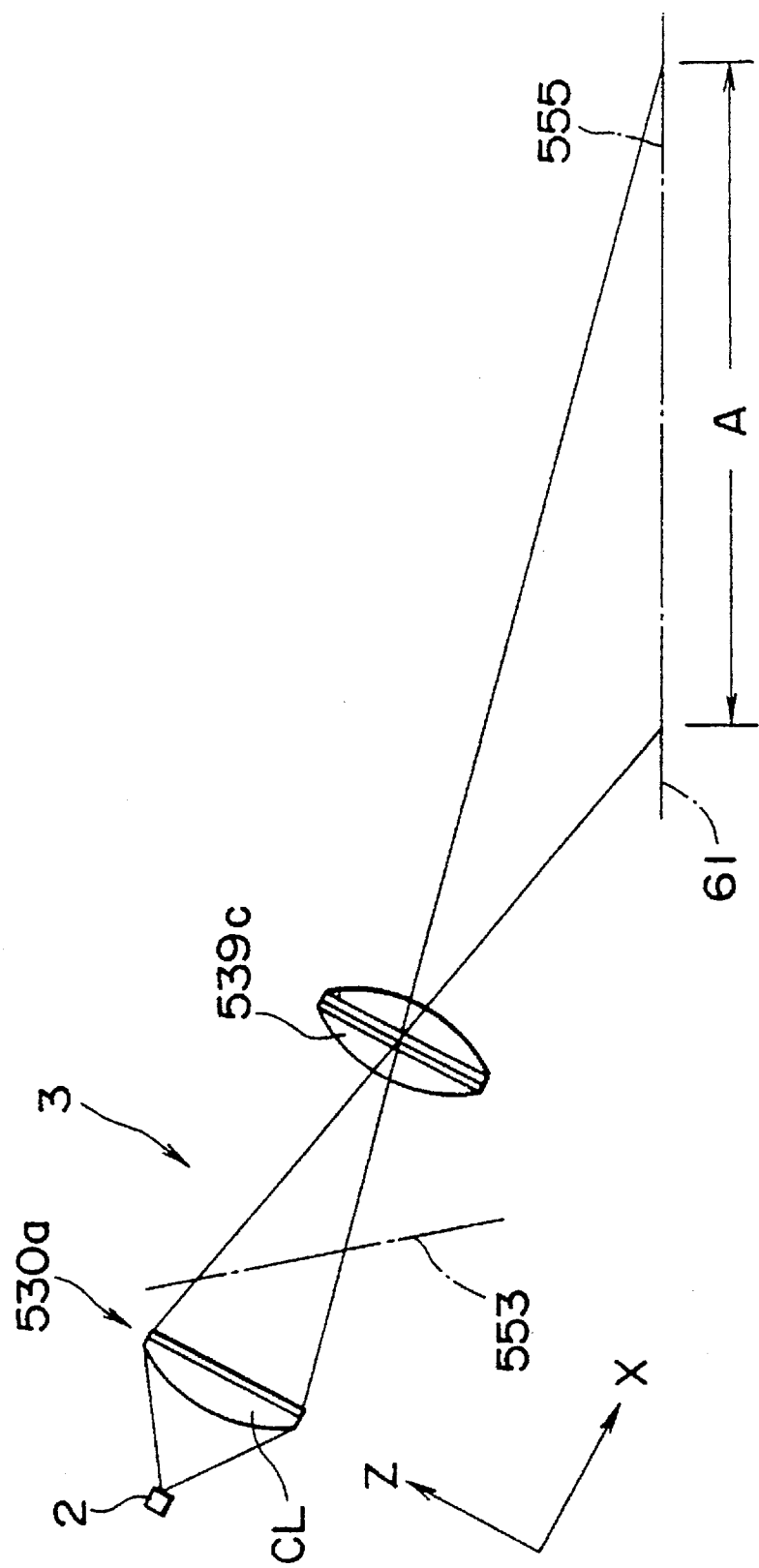
FIG. 17 is a side view of the light projection device shown In FIG. 16.
Figure 19:
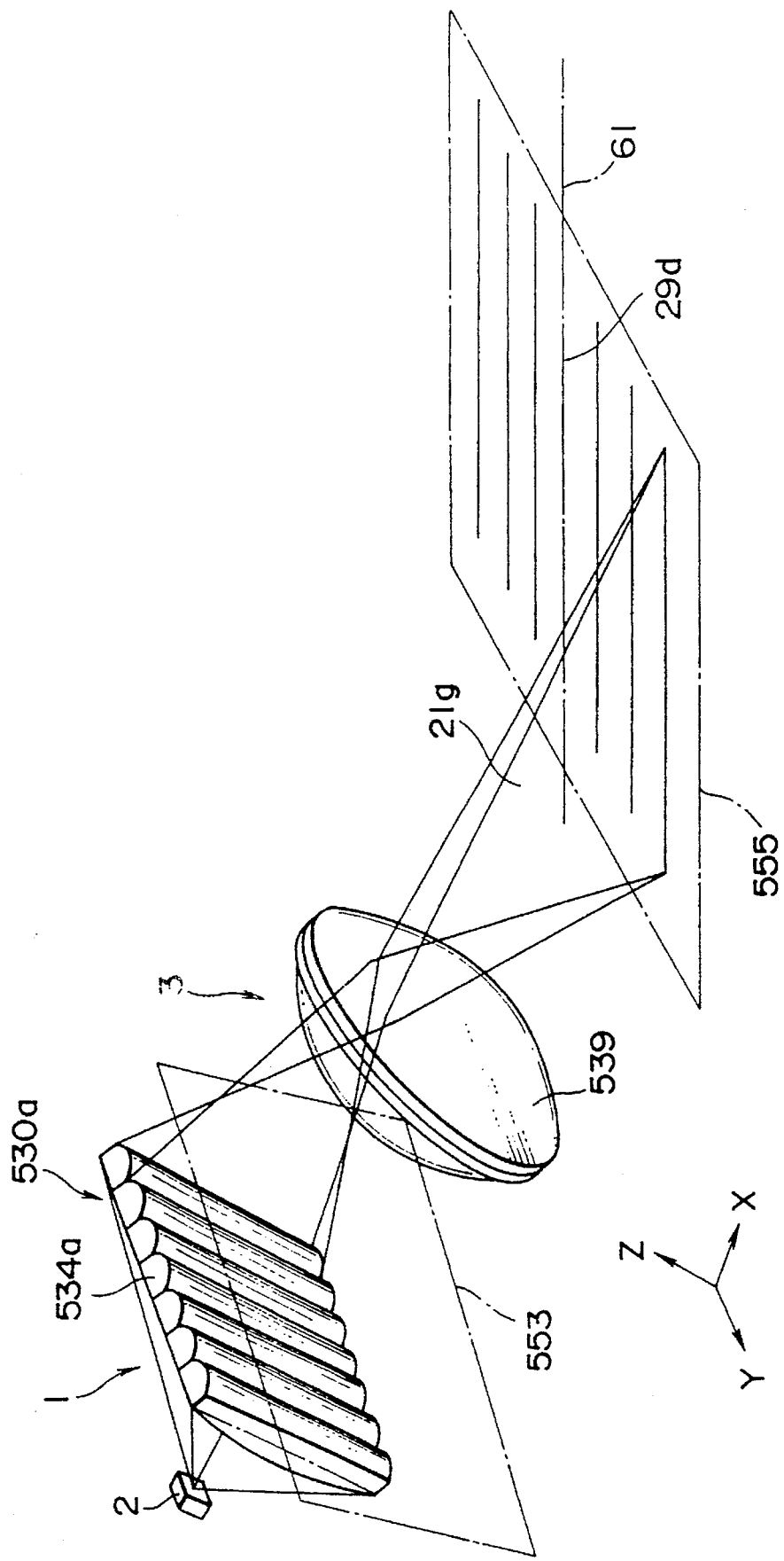
FIG. 19 shows a perspective view of the light projection device shown in FIG. 16.

FIGS. 17 and 19 show the configuration of the light projecting device 1 according to a tenth embodiment. In this configuration, the rays 521*a* through 521*g* are focused on the plane 555 which is coincident with the optical axis 61. Further, the seven rays 521*a* through 521*g* form a complex pattern, as Illustrated in the sixth embodiment, which is focused along the length A of the plane 555. Thus, a high contrast image with uneven bright and dark portions can be projected along the photographing optical axis over a wide distance range with respect to the photographing system. This results in accurate distance measurement over a wide distance range.

Light projecting devices are categorized into four groups: a critical system; a system which forms an image of the light in the projecting lens; a telecentric system; and a Kohler system. In the above described embodiments, the critical system, the system which forms an image of the light source on the principal plane of the objective lens, or the telecentric system, can be employed.

In FIG. 16, for example, the image of the light source 2 and the stripe pattern are formed on the second focal plane 55, thus, the system is recognized as the critical system. On the other hand, as shown in FIG. 17, the image of the light source 2 is formed in the projection lens 539*c*, and the stripe pattern image is on the second focal plane 555. Thus, the system is recognized as the system which forms the image of the light source on the pupil of the objective lens. Further, the light projecting device, as shown in FIG. 17, is an inclined optical system, and the image of the light source 2, the image of a stripe on the optical axis 61, and the projection lens 539*c* satisfies Scheimpflug's law.

In the above described embodiments, the lens 30 includes cylindrical lenses which are arranged side by side. It is apparent from the description that the cylindrical lenses can be replaced by toric lenses. Further, in the embodiments, the projection lens 39 has the same curvature in the directions perpendicular to each other. However, it is possible to replace the lens 39 by a toric lens.

In the embodiments, the lens 30 has a plurality of cylindrical lens arranged along the Y direction. It is also possible to replace the lens 30 with a lens in which a plurality of fly-eye lenses are arranged along the Z and Y directions.

The lens 30 in the embodiments can be Integrally formed as a single lens, a plurality of separate unit lenses joined to each other by means of an adhesive having similar optical characteristics as the lenses, or a plurality of unit lenses mounted separately from one another. Further, the unit lenses are not necessarily the same lenses, but can have different physical characteristics, optical characteristics, shapes, or sizes. The number of the unit lenses should be more than one, but is not limited.

The above-described embodiments of light projecting device can be used as a device for projecting a pattern image for a passive distance measuring system such as a TTL (through the lens) system, and can be employed in a single lens reflex camera, a compact camera, a video cam-coder, a still video camera, and the like.

As described above, according to the present invention, a predetermined pattern image can be projected over an object without forming the light emitting surface of the light source to a particular shape, or without providing a light shielding member having the predetermined pattern. Therefore, the light projecting device can be manufactured inexpensively, and easily. Further, the light emitted by the light source is efficiently used for Illuminating the object.

The light emitted from the light source diverges from the light source and is refracted by the lens 30. as shown in FIG. 1. This simple configuration ensures that separate refracted light beams are generated without the need for a diverging lens. Thus, the cost and size of the light projecting device can be reduced.

The present invention disclosure relates to subject matter contained in Japanese Patent Application No. HEI 5-093680, filed on Mar. 29, 1993, which is expressly incorporated by its reference herein.

What is claimed is:

1. A light projecting device used to project light onto an object, said device comprising:

means for emitting light; and means for projecting said emitted light, said projecting means refracting said emitted light such that an image pattern having alternate bright and dark areas is projected, said projecting means comprising at least two adjacent converging lenses which have cylindrical surfaces, said image pattern having alternate bright and dark areas being generated as a result of light projected by each of said at least two adjacent converging lenses.

2. The light projecting device according to claim 1, each of said adjacent converging lenses having a curved surface on a side away from said emitting means.

3. The light projecting device according to claim 2 wherein a f-number of one of said adjacent cylindrical converging lenses is different from a f-number of another of said adjacent cylindrical converging lenses.

4. The light projecting device according to claim 2 wherein said projecting means further comprises a second lens system, wherein said second lens system controls a direction through which said image pattern is projected.

5. The light projecting device according to claim 4 wherein a curvature of said curved surface of said at least two adjacent cylindrical converging lenses varies uniformly from a top portion of said adjacent cylindrical converging lens to a bottom portion of said adjacent cylindrical converging lens, and wherein said pattern is projected on a plane which is inclined at an angle other than 20 degrees, with respect to an optical axis of said light projecting device.

6. The light projecting device according to claim 5 wherein said projecting means further comprises a third lens system, said third lens system comprising a converging lens having two curved surfaces, each of said curved surfaces defined as a portion of a spherical surface, said at least two adjacent cylindrical converging lenses and said second lens system located between said emitting means and said third lens system.

7. The light projecting device according to claim 4 wherein said at least two adjacent cylindrical converging lenses and said second converging lens system are integrally formed.

8. The light projecting device according to claim 2 wherein said projecting means further comprises a second lens system, said second lens system comprising a converging lens, said converging lens being curved in two directions, said directions being perpendicular to each other.

9. The light projecting device according to claim 8, wherein a sum of a first focal length of said second lens system, and a second focal length of said at least two adjacent cylindrical converging lenses, between said second lens system and said at least two adjacent cylindrical converging lenses, is less than a distance between said second lens system and said at least two adjacent cylindrical converging lenses.

10. The light projecting device according to claim 8 wherein a distance between said second lens system and said at least two adjacent cylindrical converging lenses can be varied.

11. The light projecting device according to claim 2 wherein another of said plurality of converging lenses has a curved surface defined as a portion of a toric surface, said curved surface positioned on a side away from said emitting means, said at least two adjacent cylindrical converging lenses located between said emitting means and said another of said plurality of converging lenses.

12. The light projecting device according to claim 11, wherein a sum of a first focal length of said another of said plurality of converging lenses, and a second focal length of said at least two adjacent cylindrical converging lenses, between said another of said plurality of converging lenses and said at least two adjacent cylindrical converging lenses, is greater than a distance between said another of said plurality of converging lenses and said at least two adjacent cylindrical converging lenses.

13. The light projecting device according to claim 2 wherein said at least two adjacent cylindrical converging lenses are integrally formed as a lenticular lens.

14. The light projecting device according to claim 1 wherein a surface of said emitting means facing said projecting means has an electrical terminal attached thereon.

15. The light projecting device according to claim 1 wherein a surface of said emitting means facing said projecting means has at least one opaque pattern formed thereon.

16. A light projecting device employed in a passive distance measuring system, said light projecting device projecting a predetermined image pattern towards an object, said light projecting device comprising:

a light source for emitting diverging light; and a plurality of converging lenses arranged side by side, along a predetermined direction transverse to a path of said emitted light, each of said converging lenses refracting said emitted light such that said emitted light that is refracted is converged in at least said predetermined direction, whereby said emitted light that is refracted forms said predetermined image pattern, said predetermined image pattern having alternate bright and dark areas, said predetermined image pattern having alternate bright and dark areas being generated as a result of light projected by each of said plurality of converging lenses.

17. The light projecting device according to claim 16, wherein said plurality of converging lenses include at least two cylindrical lenses.

18. The light projecting device according to claim 17, wherein at least one of said at least two cylindrical lenses has an f-number that is different from another of said at least two cylindrical lenses.

19. The light projecting device according to claim 17, which further comprises another converging lens, said another converging lens controls a direction through which said image pattern is projected.

20. The light projecting device according to claim 19 wherein said at least two adjacent cylindrical converging lenses and said another converging lens are integrally formed.

21. The light projecting device according to claim 17 wherein said plurality of converging lenses are integrally formed as a lenticular lens.

22. The light projecting device according to claim 17, wherein a curvature of each of said at least two cylindrical lenses varies uniformly from one end in said direction perpendicular to said predetermined direction to an opposite end so that said predetermined image pattern Is projected on a plane coincident with an optical axis of said distance measuring system.

23. The light projecting device according to claim 17, wherein said plurality of converging lenses include a projection lens allowing light to pass through said at least two cylindrical lenses, said projection lens being provided on an opposite side of said light source with respect to said at least two cylindrical lenses.

24. The light projecting device according to claim 23, wherein said projection lens is curved along two directions, said directions being perpendicular to each other.

25. The light projecting device according to claim 23, wherein said projection lens comprises a toric lens.

26. The light projecting device according to claim 25, wherein said projection lens is movable along an optical axis thereof.

27. The light projecting device according to claim 23, wherein said projection lens has a first focal length in said predetermined direction, wherein a focal plane of said at least two cylindrical lens is behind a first focal point, which corresponds to said first focal length, on a light source side of said projection lens.

28. The light projecting device according to claim 27, wherein said projection lens has a second focal length in said direction perpendicular to said predetermined direction, said second focal length being greater than said first focal length, and wherein said focal plane of said at least two cylindrical lens is on a second focal point, which corresponds to said second focal length, on said light source side of said projection lens.

29. The light projecting device according to claim 23, wherein a curvature of each of said at least two cylindrical lenses increases uniformly from one end in said direction perpendicular to said predetermined direction to an opposite end so that said predetermined image pattern is projected on a plane coincident with an optical axis of said distance measuring system.

30. The light projecting device according to claim 29, wherein said projecting lens is a spherical lens, and wherein a focal plane on which said at least two cylindrical lenses project said predetermined image pattern, said projection lens, and said plane coincident with said optical axis of said distance measuring system satisfy Scheimplufg's law.

31. The light projecting device according to claim 23, wherein an optical axis of said light projecting device is inclined with respect to an optical axis of said distance measuring system.

32. The light projecting device according to claim 16, wherein said light source has a light emitting surface, wherein at least one opaque pattern is formed on said light emitting surface.

33. The light projecting device according to claim 16, wherein said light source has a light emitting surface wherein an electrical terminal attached thereon, said electrical terminal being used for supplying an electrical signal to said light source.

34. The light projecting device according to claim 1, a number of bright and dark areas in said image pattern being related to a number of said at least two adjacent converging lenses.

35. The light projecting device according to claim 16, a number of alternate bright and dark areas in said predetermined image pattern being related to a number of said plurality of converging lenses.

36. The light projecting device according to claim 1, an image pattern having alternate bright and dark areas being generated only as a result of light projected by each of said at least two adjacent converging lenses.

37. The light projecting device according to claim 16, an image pattern having alternate bright and dark areas being generated only as a result of light projected by each of said plurality of converging lenses.

* * * * *

UNITED STATES PATENT AND TRADEMARK OFFICE
CERTIFICATE OF CORRECTION

PATENT NO. : 5,572,368
DATED : November 5, 1996
INVENTOR(S) : H. YOKOTA et al.

It is certified that error appears in the above-indentified patent and that said Letters Patent is hereby corrected as shown below:

At column 9, line 26 (claim 22, line 5), change "Is" to ---is---.

Signed and Sealed this

First Day of April, 1997

BRUCE LEHMAN

Attest:

Attesting Officer

Commissioner of Patents and Trademarks